(12) United States Patent
Sharrah et al.

(10) Patent No.: US 7,215,084 B1
(45) Date of Patent: May 8, 2007

(54) POWER CONTROL ARRANGEMENT, AS FOR A FLASHLIGHT

(75) Inventors: Raymond L. Sharrah, Collegeville, PA (US); Norman A. Messinger, Center Square, PA (US)

(73) Assignee: Streamlight, Inc., Eagleville, PA (US)

( * ) Notice: Subject to any disclaimer, the term of this patent is extended or adjusted under 35 U.S.C. 154(b) by 59 days.

(21) Appl. No.: 10/772,786

(22) Filed: Feb. 5, 2004

Related U.S. Application Data

(60) Provisional application No. 60/446,639, filed on Feb. 11, 2003.

(51) Int. Cl.
*H05B 39/10* (2006.01)

(52) U.S. Cl. .................. 315/87; 362/20; 362/205

(58) Field of Classification Search .............. 315/33, 315/36, 46, 76, 87, 88, 180, 189; 362/228, 362/229, 20, 205, 184, 216
See application file for complete search history.

(56) References Cited

U.S. PATENT DOCUMENTS

| | | | | |
|---|---|---|---|---|
| 1,119,663 A | 12/1914 | Swallow | ...................... | 362/199 |
| 1,214,583 A | 2/1917 | Persons | ...................... | 362/247 |
| 1,559,930 A | 11/1925 | Bean | ........................... | 362/510 |
| 1,889,936 A | 12/1932 | Shannon | .................... | 362/184 |
| 2,701,332 A | 2/1955 | Andre | ........................ | 320/113 |
| 3,659,119 A * | 4/1972 | Kasama et al. | ............. | 327/124 |
| 3,953,768 A * | 4/1976 | Meredith et al. | ........... | 315/362 |
| 3,999,110 A | 12/1976 | Ramstrom et al. | .......... | 320/112 |
| 4,228,485 A | 10/1980 | Hubbard et al. | ............ | 362/191 |
| 4,249,234 A * | 2/1981 | Park et al. | ................... | 362/228 |
| 4,290,095 A | 9/1981 | Schmidt | ...................... | 362/191 |
| 4,423,473 A | 12/1983 | Kirkley | ....................... | 362/186 |
| 4,463,283 A | 7/1984 | Penney et al. | ................. | 315/87 |
| 4,803,605 A | 2/1989 | Schaller et al. | ............. | 362/184 |
| 4,823,242 A | 4/1989 | Maglica et al. | ............. | 362/187 |
| 4,963,798 A | 10/1990 | McDermott | .................. | 315/312 |
| 5,142,458 A | 8/1992 | Brunson | ...................... | 362/184 |
| 5,161,879 A | 11/1992 | McDermott | .................. | 362/206 |
| 5,225,760 A | 7/1993 | Leiserson | .................... | 320/112 |
| 5,359,779 A | 11/1994 | Polk et al. | ..................... | 42/115 |
| 5,374,876 A * | 12/1994 | Horibata et al. | ............. | 315/313 |
| 5,410,461 A | 4/1995 | Petzl | ........................... | 362/251 |

(Continued)

FOREIGN PATENT DOCUMENTS

EP  1 029 706 A2  8/2000

(Continued)

OTHER PUBLICATIONS

Aquila Products, "Cyclops Specification for Rechargeable Board", http://www.aquilapro.demo.co.uk/clip.html, Printed Jan. 14, 2004, 3 Pages.

(Continued)

*Primary Examiner*—Tuyet Vo
*Assistant Examiner*—Ephrem Alemu
(74) *Attorney, Agent, or Firm*—Clement A. Berard; Dann, Dorfman, Herrell & Skillman

(57) ABSTRACT

In a battery-operated apparatus comprising a load, a battery and a switch in circuit for selectively energizing the load: a comparator compares a potential produced by the battery and a reference potential for de-energizing the load when the battery potential is below a predetermined potential.

48 Claims, 8 Drawing Sheets

U.S. PATENT DOCUMENTS

| | | | |
|---|---|---|---|
| 5,418,433 A | 5/1995 | Nilssen | |
| 5,418,443 A | 5/1995 | Kikuchi | 318/807 |
| 5,469,346 A | 11/1995 | Haut et al. | 362/205 |
| 5,580,156 A | 12/1996 | Suzuki et al. | 362/184 |
| 5,629,105 A | 5/1997 | Matthews | 429/97 |
| 5,707,137 A | 1/1998 | Hon | 362/183 |
| 5,746,495 A | 5/1998 | Kluamm | 362/577 |
| 5,871,272 A | 2/1999 | Sharrah et al. | 362/184 |
| 5,903,132 A | 5/1999 | Ohira et al. | 320/107 |
| 6,002,236 A | 12/1999 | Trant et al. | 320/114 |
| 6,012,824 A | 1/2000 | Sharrah et al. | 362/199 |
| 6,040,660 A | 3/2000 | Schmidt et al. | 315/200 A |
| 6,046,572 A | 4/2000 | Matthews | |
| 6,091,238 A * | 7/2000 | McDermott | 315/307 |
| 6,222,138 B1 | 4/2001 | Matthews | |
| 6,249,089 B1 | 6/2001 | Bruwer | |
| 6,250,771 B1 | 6/2001 | Sharrah et al. | 362/184 |
| 6,316,880 B1 | 11/2001 | Broadhurst | 315/200 A |
| 6,371,450 B1 | 4/2002 | Davis et al. | 261/26 |
| 6,428,179 B1 | 8/2002 | Saffron et al. | 362/118 |
| 6,523,972 B2 | 2/2003 | Sharrah et al. | 362/184 |
| 6,621,225 B2 | 9/2003 | Bruwer | |
| 6,623,139 B1 * | 9/2003 | Gutmann | 362/184 |
| 6,650,066 B2 | 11/2003 | Bruwer | |
| 6,659,621 B2 | 12/2003 | Sharrah et al. | 362/183 |
| 6,841,941 B2 * | 1/2005 | Kim et al. | 315/86 |
| 6,952,084 B2 | 10/2005 | Bruwer | |
| 6,984,900 B1 | 1/2006 | Bruwer | |
| 2002/0097576 A1 | 7/2002 | Sharrah | |
| 2004/0217655 A1 | 11/2004 | Bruwer | |
| 2004/0227409 A1 | 11/2004 | Bruwer | |
| 2005/0077837 A1 | 4/2005 | Kim | |
| 2005/0083626 A1 | 4/2005 | Bruwer | |
| 2005/0121980 A1 | 6/2005 | Bruwer | |
| 2005/0122710 A1 | 6/2005 | Kim | |
| 2005/0122712 A1 | 6/2005 | Kim | |
| 2005/0122714 A1 | 6/2005 | Matthews | |
| 2005/0128741 A1 | 6/2005 | Matthews | |
| 2005/0140310 A1 | 6/2005 | Bruwer | |
| 2005/0237737 A1 | 10/2005 | Kim | |

FOREIGN PATENT DOCUMENTS

EP      1 029 706 A3      2/2001

OTHER PUBLICATIONS

Green Mountain Traders, "Novigear TM-6 Three-In-One", http://www.greenmountaintraders.com/notmth.html, Printed Jan. 6, 2004, 3 Pages.

* cited by examiner

POWER CONTROL ARRANGEMENT, AS FOR A FLASHLIGHT

This Application hereby claims the benefit of U.S. Provisional Patent Application No. 60/446,639 filed Feb. 11, 2003.

The present invention relates to a power control, and, in particular, to a power control for battery operated apparatus such as a light.

Flashlights, being battery powered devices, provide light over a limited period of time before the battery needs to be replaced, in the case of a non-rechargeable battery, or recharged, in the case of a rechargeable battery. As the battery approaches a discharged state, the intensity of the light produced by the flashlight typically diminishes and finally extinguishes. While a discharged battery may result from heavy use of the light, such is not always the case. A light may accidentally become switched on, e.g., in a pocket, a suitcase, a briefcase, an automobile glove box and the like, or the battery may lose much of its charge after a period of storage or other non-use.

This can produce undesirable results. First, the user is left with insufficient illumination or lack of illumination. This is not acceptable in circumstances involving what may be a dangerous or hazardous situation and/or location, as can be the case for law enforcement, public safety, fire, security, military, and/or environmental hazard personnel. For a rechargeable plural-cell battery, fully discharging the battery usually causes at least one of the cells (e.g., a weaker cell having a relatively lower capacity) to fully discharge and to be "charged" in a reverse-polarity direction by the current drawn from stronger (relatively higher capacity) cell(s). Significant and/or repeated reverse-polarity charging of a battery cell may lead to reduced recharge cycle life and/or to premature loss of capacity and/or other cell failure.

Accordingly, there is a need for a flashlight that reduces the effects of fully discharging the battery and/or which can provide usable light even after the battery is substantially discharged.

To this end, the present invention comprises in a battery-operated apparatus comprising a load, a battery and a switch in circuit for selectively energizing the load, a source of a reference potential, and comparator responsive to a potential produced by the battery and to the reference potential for de-energizing the load when the battery potential is below a predetermined potential.

BRIEF DESCRIPTION OF THE DRAWING

The detailed description of the preferred embodiments of the present invention will be more easily and better understood when read in conjunction with the FIGURES of the Drawing which include.

Figure 1:
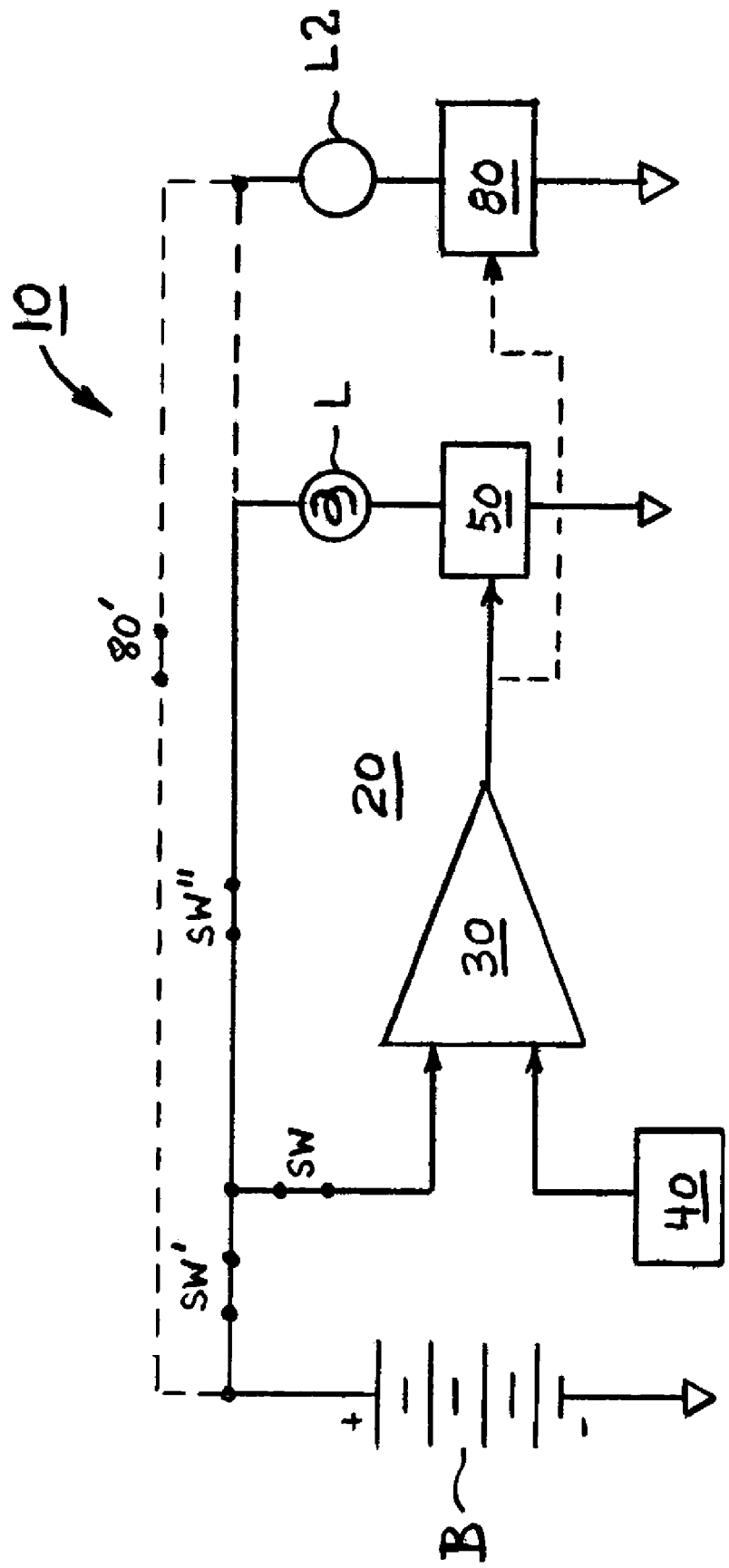
FIG. 1 is a schematic block diagram including an example power control as for a battery-operated light.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. It is noted that, according to common practice, the various features of the drawing are not to scale, and the dimensions of the various features are arbitrarily expanded or reduced for clarity.

DESCRIPTION OF THE PREFERRED EMBODIMENT

FIG. 1 is a schematic block diagram of a battery-operated light 10 (herein referred to as a "flashlight") including an example power control 20. Flashlight 10 comprises a light source L, a battery B and a switch SW, SW' and/or SW" in circuit for selectively energizing the light source L to produce light. Means 30 compares a potential (voltage) produced by the battery B and a reference potential produced by reference source 40 for de-energizing, e.g., via controllable switch 50, the light source L when the battery B potential is below a predetermined potential. Typically, the battery B potential will fall below the predetermined potential when the battery B is or becomes discharged, and the predetermined potential may be selected to correspond to the light source L producing little or no useful light output.

Light source L is typically an incandescent lamp of any suitable type, for example, a conventional filament lamp, a halogen lamp, a xenon lamp, a krypton lamp and the like. Battery B may be a one-time use battery, i.e. a non-rechargeable battery B such as a carbon cell battery, an alkaline battery or a lithium cell battery, or may be a rechargeable battery B, such as a nickel-cadmium cell battery, an Ni-MH battery and the like. Means 30 may be an integrated circuit or an electronic circuit of discrete components, and reference 40 may be a diode, a Zener diode, a cell, or other device that provides a potential (voltage) of suitable value. Switch SW, SW' and/or SW" may be connected in circuit in any convenient manner, e.g., a switch SW' in series with battery B, a switch SW" in series with light source L, and/or a switch SW within power control 20.

Additionally and/or optionally, a second light source L2 is provided that operates to produce light at a lesser current than is required by light source L. Second light source L2 is selectively energized to produce light by a second switch 80 in circuit therewith. Second switch 80 may be a manual switch and/or may be a controllable switch that is responsive to comparator 30. Alternatively, the second switch may be a manual switch, e.g., switch 80', operable independently of the switch SW, SW', SW" for controlling energization of light source L2 independently of energization of lamp L. Switch 80 may be provided and operated in cooperation with switch 80 or without switch 80.

Thus, flashlight 10 may operate so that the user may control the production of light by light sources L and L2 independently of each other and/or that the control of light sources L, L2 to produce light is dependent one upon the other. In the first case, the user may utilized either light source L alone, or may utilize light source L2 alone, and/or may utilize light sources L and L2 together. Where operation of light sources L and L2 is dependent, typically second light source L2 is energized when comparison means 30 de-energizes first light source L.

Thus, even if battery B is discharged sufficiently that comparison means 30 de-energizes light source L, second light source L2 may be energized to produce light, e.g., light sufficient for the user to move to a lighter and/or safer location. Although the illumination level (light output) produced by second light source L2 is less than that from an adequately powered light source L, the illumination level thereof is substantial and provides continuing light long after light source L would have fully discharged battery B ceased to produce light.

Figure 2:
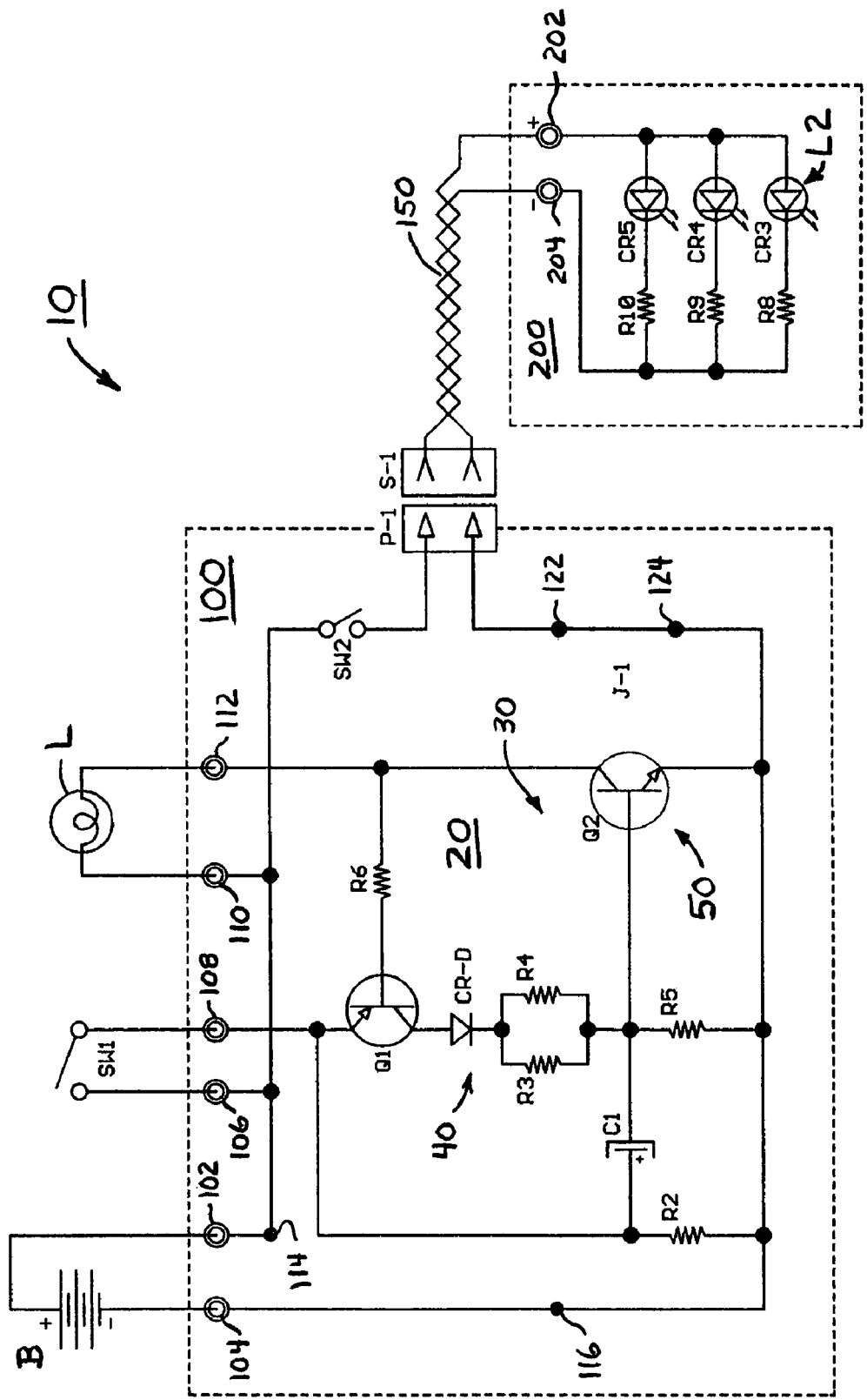
FIG. 2 is a schematic diagram including an example embodiment of a power control circuit, as for a battery-operated light.

FIG. 2 is a schematic diagram including an example embodiment of a power control circuit 20, as for a flashlight 10. Power control circuit 20 is provided, for example, on a printed wiring circuit board 100 that includes terminals 102–124 at which connect external components. Battery B connects to terminals 102 and 104, switch SW1 connects to terminals 106 and 108, and lamp L connects to terminals 110 and 112. One lead of lamp L is connected to the positive terminal of battery B via terminals 110 and 102. Terminals 114 and 116 are described below. Terminals 122, 124 are provided for connecting a suitable resistance in series with LED board 200.

Connector P-1 is provided on circuit board 100 for connecting LED board 200 via wires 150 and connector S-1, and selective connection of LED board 200 to battery B is provided by switch SW2. LED board 200 includes three light-emitting diodes (LEDs) CR3, CR4 and CR5 in parallel, each having a respective series resistor R8, R9 and RIO for determining, e.g., limiting, the current that flows in each diode. Typically, resistors R8, R9 and RIO are of like ohmic value so that substantially the same current flows in each of LEDs CR3, CR4 and CR5. LEDs CR3, CR4 and CR5, with or without the other components of board 200, may be deemed to comprise light source L2. LEDs CR3, CR4 and CR5 are in series circuit with switch SW2 and battery B, and so are controllable by switch SW2 independently of switch SW1.

When switch SW1 is open, no current flows through transistors Q1–Q2 and so no current flows through lamp L, which is off. When switch SW1 is closed, current may flow through lamp L as determined by the operation of power control 20. Thus, lamp L is turned on and off by operation of switch SW1.

The example power control circuit 20 illustrated in FIG. 2 comprises transistors Q1 and Q2 connected in a "regenerative" or "supportive" arrangement, e.g., if Q1 is "on" then Q2 is "on" and if Q2 is "on" then Q1 is "on." Specifically, turning NPN transistor Q2 to an "on" state provides base current (via resistor R6) to PNP transistor Q1 which becomes turned to an "on" state to provide additional base current (via diode CR-D and resistors R3–R4) to transistor Q2 until both transistors Q1 and Q2 are highly conductive and hold each other in the "on" condition. Transistor Q2 when "on" provides a conduction path via terminals 112 and 104 for current to flow through lamp L to the negative terminal of battery B thereby to energize lamp L to produce light.

Initial base current to turn transistor Q2 "on" is provided via capacitor C1 when switch SW1 is closed to apply battery B voltage to capacitor C1 and to the emitter of transistor Q1. Resistor R2 allows capacitor C1 to discharge when switch SW1 is open, and conducts a low current when switch SW1 is closed.

Lamp L remains energized until switch SW1 is opened or until the voltage of battery B decreases to the predetermined potential at which transistors Q1 and/or Q2 become starved for base current and turn "off" i.e. operate as power control 20 to terminate the discharge of battery B by de-energizing lamp L.

In the example circuit of FIG. 2, diode CR-D and the base-emitter conduction voltage ($V_{B-E}$) of transistor Q2 serve to provide a reference potential (voltage) 40 that defines the predetermined potential (voltage) against which the battery B voltage is compared for establishing the potential (battery voltage) at which the transistor pair Q1–Q2 turns "off" for de-energizing lamp L. The comparison 30 effectively occurs at the base of transistor Q2 which, as the means 30 for comparing, tends to turn "off" as the battery B voltage decreases below the predetermined potential (of source 40) and also provides the function of controllable switch 50.

In other words, power cut-off occurs when the voltage of battery B falls to the predetermined voltage at which it is no longer sufficient to maintain drive current to the base of transistor Q2. In this condition, the battery voltage is no longer sufficient to overcome the potential across reference potential source 40 diode CR-D and the resistance of R3/R4 to provide base current to transistor Q2. As transistor Q2 is thus starved for base current and turns "off," the base current to transistor Q1 also reduces until Q1 and Q2 turn "off" and lamp L is de-energized. Thus, power control 20 de-energized lamp L when the voltage of battery B decreases to the predetermined potential.

In addition, the voltage division provided by resistors R3, R4 and R5 may be utilized for controlling the gain of the Q1–Q2 transistor pair for softening the sharpness of the turning off of transistors Q1 and Q2 when the battery B voltage drops, e.g., to provide a "soft" turn off in which the light intensity of lamp L gradually diminishes, thereby to mimic the loss of light that would be experienced if the battery were allowed to fully discharge.

Because lamp L is now off, the current discharge from battery B is substantially reduced (e.g., to the negligible current flowing through resistor R2) and so the remaining capacity of battery B is available for energizing LEDs CR3, CR4 and CR5, e.g., when the user actuates switch SW2. Incandescent lamp L remains off unless and until the user switches switch SW1 off (open) and then switches switch SW1 on (closed) again, and then lamp L will only become energized to produce light if the voltage of battery B is above the predetermined potential. I.e., if battery B is discharged so as to provide too low a voltage, lamp L cannot be energized.

In the example circuit arrangement of FIG. 2, transistor Q1 may be a general purpose transistor type 2N2907A, e.g., such as type 2N2907A or a type MPS2907A available from Mouser Electronics, located in Mansfield, Tex., and transistor Q2 may be a high-power transistor, e.g., such as type ZTX-849-ND available from Digi-Key Electronics, located in Mansfield, Tex., or from Zetex Inc. located in Commack, N.Y. The resistance between terminals 122, 124 is a low value resistance, such as a short length of copper wire designated as jumper J-1, as is satisfactory where battery B is a three cell battery, e.g., comprising three non-rechargeable alkaline battery cells. Reference potential source 40 includes diode CR-D which may be a 1N4148 silicon diode.

All of the electrical components described are typically disposed in a flashlight housing having switches SW1 and SW2 mounted so as to be accessible to a user of the flashlight 10 on the outside of the housing thereof.

Power cut off 20 actuates to turn off lamp L when the battery B reaches a low voltage (e.g., about 0.6 v/cell). Preferably the value of the voltage reference device, e.g., the diode CR-D, is selected so that the lamp dims before being cut off. This gives the user an indication that the battery is low, as well as protecting the battery. The LEDs are switched on and off manually independent of the lamp switch and the power cut off circuit.

It is noted that the terminal voltage of battery B decreases over time as the current necessary for lamp L to produce light discharges the cells thereof. Typically, the decrease in terminal voltage is thought to result from chemical changes within the electrochemical battery cell that causes the cell voltage to decrease and/or the apparent cell resistance to increase as the battery cell discharges. Typically, the terminal voltage during discharge is about 80% or more of the open circuit voltage at full charge, over the useful capacity of the battery cells.

Only after most of the battery cell capacity has been substantially discharged does the terminal voltage decrease significantly further, however, this decrease is typically dramatic. The terminal voltage drops relatively quickly under the discharging load of lamp L and causes comparator 20 to de-energize lamp L. De-energizing lamp L removes the discharge current load from battery B and the terminal voltage thereof typically increases. Because the discharge current load for energizing light source(s) LED is substantially lower than that of lamp L, the remaining capacity of battery B can produce light from light source(s) LED for a substantial additional time.

Figure 3:
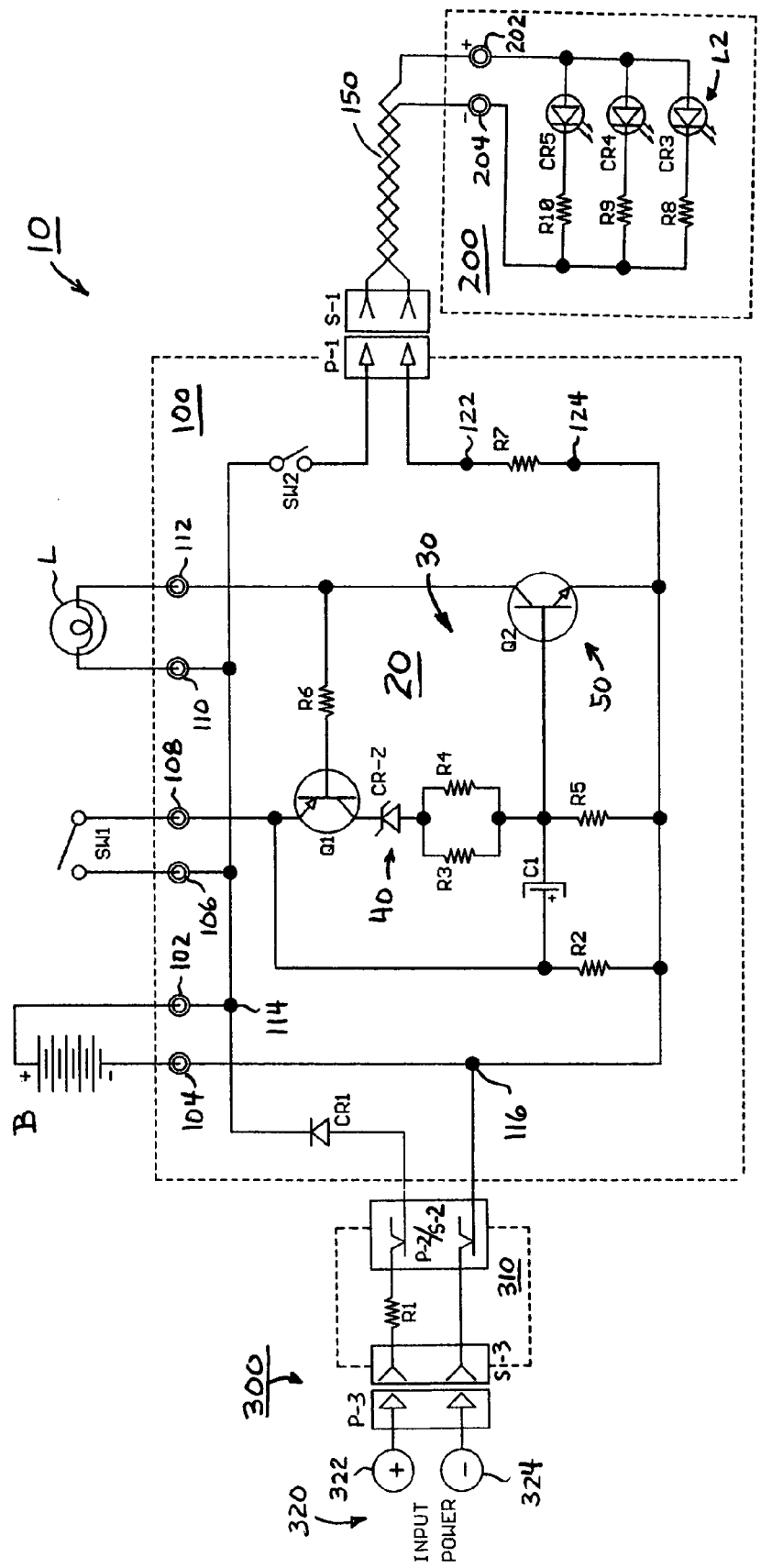
FIG. 3 is a schematic diagram including another example embodiment of a power control circuit, as for a battery-operated light.

FIG. 3 is a schematic diagram including another example embodiment of a power control circuit, as for a flashlight 10. This example embodiment is the same as the example embodiment of FIG. 2, and operation thereof is also the same, except that battery B is, for example, a rechargeable battery and means for charging battery B are provided. In fact, circuit board 100 of FIG. 3 may be the same circuit board as circuit board 100 of FIG. 2 except that the values of various electronic components are changed to suit the particular battery voltages and currents to which it will be subjected, and except that additional components are mounted thereon for accepting charging current for battery B. In addition, the ohmic value of certain resistors may be adjusted consistently with the higher terminal voltage of the example battery B of FIG. 3.

For the example illustrated, battery B is a five-cell rechargeable NiCd or NiMH battery providing a nominal voltage of about 7 volts. Charging current for battery B flows from a source 300 of charging current through diode CR1, e.g., a 1N4001 or a 1N4002 diode, of circuit board 100. Charger 300 receives power at terminals 322 and 324 from a DC power source, such as from a transformer/rectifier (not shown) that receives AC power and provides DC power at suitable voltage and current levels, or from an automotive or other DC source.

In an example charger 300, charging sleeve 310 is provided to receive and hold flashlight 10 for charging. To this end, charging sleeve 310 includes a pair of electrical contacts P-2 that receive and make contact with a corresponding pair of electrical contacts S-2 of flashlight 10 when flashlight 10 is placed or latched into charging sleeve 310. Charging sleeve 310 includes a resistor R1 for limiting the charging current that can flow to battery B to a safe level.

For convenience, power source 320 may include a molded transformer/rectifier assembly that plugs into an AC power receptacle (e.g., a wall outlet) and/or may include a connector that plugs into an automobile cigarette lighter socket, and power source 320 may also include an electrical wire extending therefrom that includes an electrical connector P-3 at the end thereof that plugs into electrical connector S-3 of charging sleeve 310, or alternatively, may plug into an electrical connector S-3 of flashlight 10. Alternatively, power source 320 may include permanent wiring to an automobile or other vehicular electrical system.

In addition, because the voltage of the example five-cell battery B of FIG. 3 is greater than that of the example three-cell battery B of FIG. 2, the low resistance provided by jumper J-1 between terminals 122 and 124 described above is increased by connecting a resistor R7 between terminals 122–124 in place of jumper J-1 to provide a resistance for limiting the current in LEDs CR3–CR5 to the desired value. The resistance of resistor R7 cooperates with the resistance of resistors R8–R10 to limit the current in LEDs CR8–CR10, and is of a suitable power rating consistent with the maximum expected voltages and currents.

Similarly, because of the higher voltage of the example five-cell battery B, reference potential source 40 is provided by a Zener diode CR-Z, e.g., such as a 2.4 volt Zener diode type 1N5221B or a type TZM5221B available from Mouser Electronics, located in Mansfield, Tex., rather than a silicon diode CR-D as above described. Thus reference potential source 40 provides a higher reference potential consistent with the higher voltage of the example five cell battery B.

For example, in a flashlight 10 of FIG. 3 having a battery comprising five NiCd or NiMH battery cells that produce an open circuit voltage of about 7 volts when fully charged, the battery terminal voltage under the load of a halogen-type incandescent lamp remained above 5.6 volts for about 70 minutes, after which the battery voltage dropped from about 5.6 volts to about 2.4 volts within 12–16 minutes during which control circuit 20 gradually de-energized lamp L in order tp prevent the battery B voltage from decreasing below about 2.4 volts. When the voltage across lamp L falls to less than about 0.65 volts, base current to transistor Q1 is reduced which reduces the base current to transistor Q2 which further reduces base current to transistor Q1. This degenerative action continues rapidly until transistors Q1 and Q2 no longer conduct and lamp L is de-energized. At this condition, the battery B voltage returns to almost 5.7 volts.

Three white LEDs were switched on and, beginning with a battery voltage of about 5.6 volts, produced light (e.g., at a current of about 5 milliamperes or greater flowing in each LED CR3–CR5) for more than about 80–100 minutes before the battery B voltage reached about 3 volts. Current flowing in LEDs CR3-CR-5 gradually decreases to zero when the battery B voltage reaches about 2.4 volts. Therefore, battery B is not discharged beyond a voltage of about 2.7 volts.

Accordingly, a power control 20 for battery-operated apparatus comprises first and second terminals 102, 104 across which a battery potential may be applied, a first transistor Q1 having a controllable conduction path between first and second electrodes (e.g., emitter and collector electrodes) and having a control electrode (e.g., a base electrode) for controlling the conduction of the controllable conduction path thereof, the first electrode (e.g., emitter electrode) thereof being coupled to the first terminal 102, and a second transistor Q2 having a controllable conduction path between first and second electrodes (e.g., emitter and collector electrodes) and having a control electrode (e.g., a base electrode) for controlling the conduction of the controllable conduction path thereof, the first electrode (e.g., emitter electrode)

thereof being coupled to the second terminal 104. A source of reference potential 40 (e.g., CR-D, CR-Z) is coupled between the second electrode (e.g., collector electrode) of the first transistor Q1 and the control electrode (e.g., base electrode) of the second transistor Q2 and means 106, 108, 110, 112, SW1 couples the second electrode (e.g., collector electrode) of the second transistor Q2 to the control electrode (e.g., base electrode) of the first transistor Q1 and to the first terminal 102 via a load, e.g., a lamp L.

It is noted that the example embodiments of FIGS. 2 and 3 include two switches SW1 and SW2 that provide independent selective energization of light source L and second light source L2. In other words, a user of light 10 may turn lamp L on and off using switch SW1 independently of using switch SW2 to turn light source L2 on and off. Thus, at any given time, both light sources may be on, both light sources may be off, or one light source may be on and the other light source off, as desired.

Figure 4:
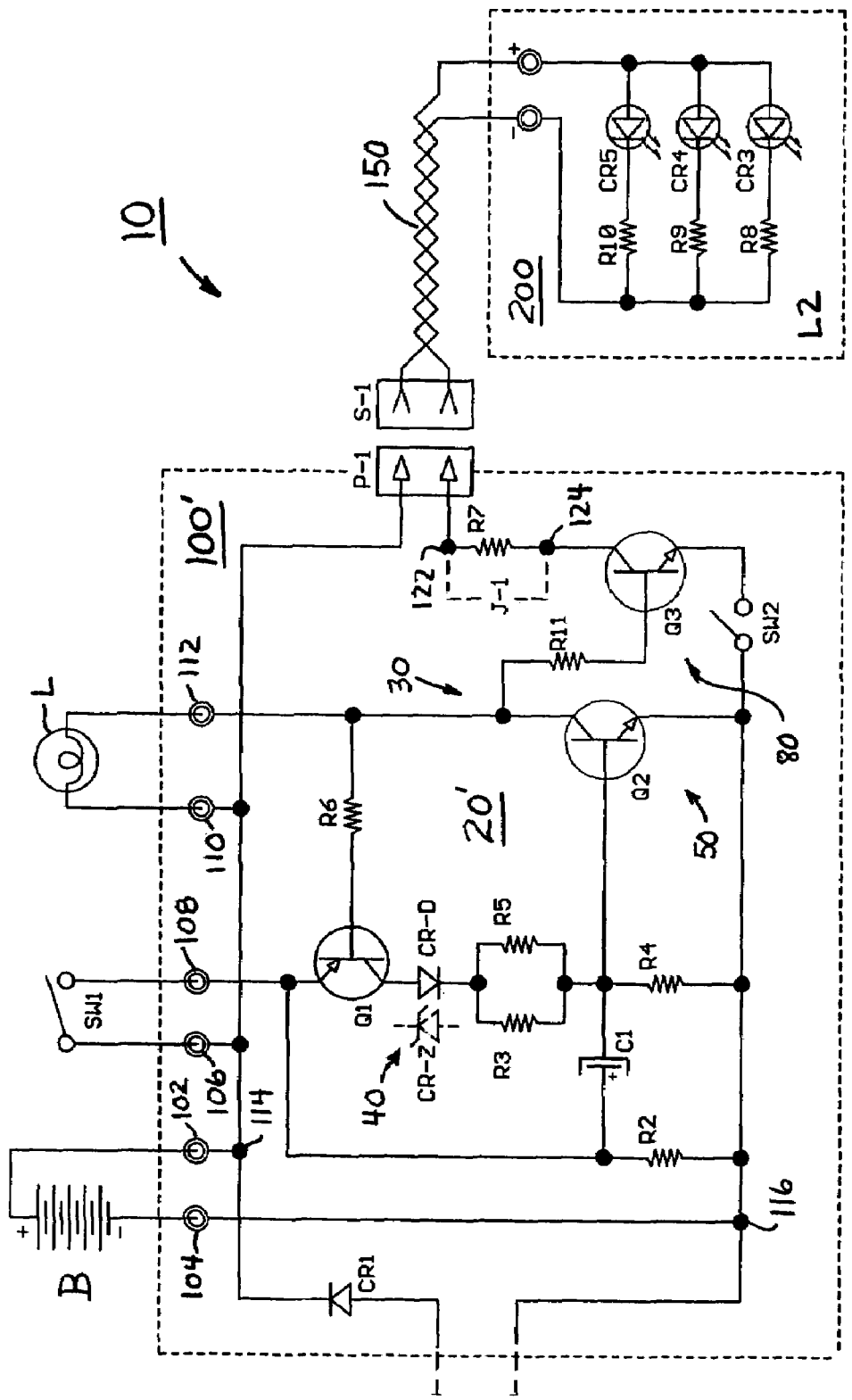
FIG. 4 is a schematic diagram including another example embodiment of a power control circuit, as for a battery-operated light.

FIG. 4 is a schematic diagram including another example embodiment of a power control circuit 20', as for a flashlight 10. Therein, when lamp L is energized to produce light by closing switch SW1, light source L2 is not responsive to switch SW2 and cannot be turned on until switch SW1 is opened or the voltage of battery B decreases to the predetermined potential at which power control 20' operates to de-energize lamp L, at which time light source L2 is responsive to switch SW2.

In the drawing of FIG. 4, two reference voltage sources CR-D and CR-Z are shown and both jumper J-1 and resistor R7 are shown, it being understood that only one of each would normally be employed as may be appropriate in view of the battery voltage, lamp type and other design variations, as described above. Circuit board 100' of FIG. 4 may be the same circuit board as circuit board 100 of FIGS. 2 and 3 except that the values of various electronic components may be changed to suit the particular voltages and currents to which it will be subjected, and except that additional components and printed conductors are provided for controlling the operation of a second light source L2. Battery B connects to terminals 102 and 104, switch SW1 connects to terminal 104 and to the emitter of transistor Q3, and lamp L connects to terminals 110 and 112. One lead of lamp L is connected to the positive terminal of battery B via terminals 110 and 102.

Power control circuit 20' is the same as power control 20 shown in FIGS. 2 and 3 except that resistor R11 and NPN transistor Q3 are added, and circuit board 100 is modified 100'' to carry the additional components. Thus, power control 20' operates to energize and de-energize lamp L in like manner to power control 20 as described above. LED light source L2 can be energized only if switch SW2 is closed, however, light source L2 is not energized unless transistor Q3 is "on" and conducting sufficient current to energize light source L2. Transistor Q3 provides a controllable switch function 80 as described above in relation to FIG. 1, for example.

Specifically, when switch SW1 is closed and transistor Q2 is turned "on" thereby applying battery B voltage to energize lamp L, the base of transistor Q3 is maintained at a low voltage and transistor Q3 is held "off." When power control 20' operates to de-energize lamp L, however, the voltage at the collector of transistor Q2 increases and base current for transistor Q3 flows through resistor R11 and switch SW2, if closed, to turn Q3 "on" thereby to conduct current from battery B through light source L2 to energize LEDs CR3–CR5.

If battery B has sufficient energy (charge) so that its voltage is greater than the predetermined potential at which power control 20' operates to de-energize lamp L, operating switch SW1 will selectively turn lamp L on and off, but operating switch SW2 will not turn LED light source L2 on to produce light unless switch SW1 is open or transistor Q2 is "off" and lamp L is off. Because the collector of transistor Q2 is coupled to battery B through lamp L, battery voltage will be present at the collector of transistor Q2 via lamp L when switch SW1 is open or when power control 20' has operated to de-energize lamp L, base current is then available to turn transistor Q3 "on" whereby switch SW2 is operable for selectively energizing and de-energizing LED light source L2.

For example, as power control 20' begins to operate to de-energize lamp L, transistor Q2 begins to desaturate (i.e. become less conductive than it is in the saturated state) and its collector voltage rises. When the Q2 collector voltage exceeds the turn-on threshold of transistor Q3 (e.g., about 0.65 volt), Q3 begins to conduct if switch SW2 is closed and LEDs CR3–CR5 begin to produce light (e.g., when the voltage applied thereto exceeds a threshold of about 2.5 volts). As the voltage of battery B decreases further, the voltage at the collector of Q2 increases further and lamp L further dims and Q3 turns further on, whereby LEDs CR3–CR5 of light source L2 receive additional power and produce additional light. This regenerative action continues until lamp L is extinguished and LEDs CR3–CR5 are fully energized commensurate with the charge remaining in battery B. LEDs CR3–CR5 will remain energized until SW2 is opened or battery B discharges to where it no longer has sufficient voltage to energize LEDs CR3–CR5 (e.g., less than the forward voltage of LEDs CR3–CR5 which is typically about 2.5 volts).

However, when lamp L is energized to produce light, light source L2 is not responsive to switch SW2 and cannot be turned on until switch SW1 is opened or the voltage of battery B decreases to the predetermined potential at which power control 20' operates to de-energize lamp L, at which time light source L2 is responsive to switch SW2. In this embodiment, LEDs CR3–CR5 become energized to produce light as lamp L begins to dim as control 20 acts. Should both switches SW1 and SW2 remain closed after the battery is discharged to the point where LEDs CR3–CR5 do not produce substantial light, battery B will eventually become discharged to about 0.65 volt as a result of the current flowing through resistor R11 and the forward biased base-emitter voltage ($V_{B-E}$) of transistor Q3.

Figure 5:
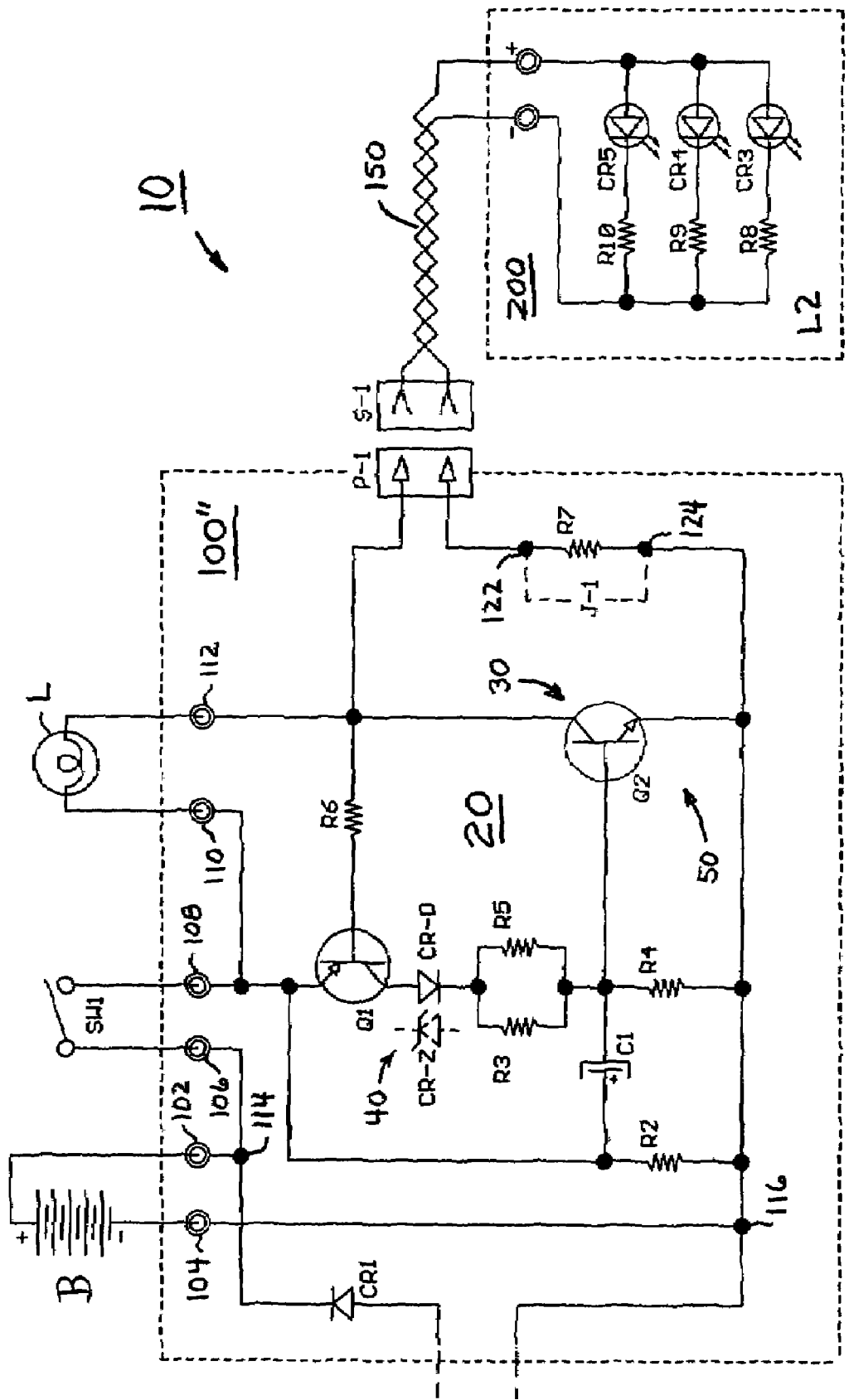
FIG. 5 is a schematic diagram including another example embodiment of a power control circuit, as for a battery-operated light.

FIG. 5 is a schematic diagram including another example embodiment of a power control circuit 20, as for a flashlight 10. Therein, lamp L is energized to produce light by closing switch SW1 and no switch is provided for separately energizing light source L2. When the voltage of battery B decreases to the predetermined potential at which power control 20 operates to de-energize lamp L, light source L2 is energized by connection to battery B via lamp L. Then, light source L2 may be de-energized by opening switch SW1.

In the drawing of FIG. 5, two reference voltage sources CR-D and CR-Z are shown and both jumper J-1 and resistor R7 are shown, it being understood that only one of each would normally be employed as may be appropriate in view of the battery voltage, lamp type and other design variations, as described above. Circuit board 100'' of FIG. 5 may be the same circuit board as circuit board 100' of FIG. 4 except that the values of various electronic components may be changed to suit the particular voltages and currents to which it will be subjected, and except that additional and/or different printed conductors are provided for controlling the operation of second light source L2. Battery B connects to terminals 102 and 104, switch SW1 connects to terminals 106 and 108, and lamp L connects to terminals 110 and 112. One lead of lamp L is connected to the switched end of switch SW1 at terminal 108 and thence to the positive terminal of battery B via switch SW1 and terminals 106 and 102.

Power control circuit 20 is the same as power control 20 shown in FIGS. 2 and 3 and circuit board 100" may be the same as circuit board 100 except that it is modified to connect second light source L2 to terminal 112 and the collector of transistor Q2 rather than to battery B via switch SW2. Thus, power control 20 operates to energize and de-energize lamp L as described above.

Lamp L is selectively energized and de-energized by closing and opening switch SW1 and LED light source L2 can be energized only if switch SW1 is closed and transistor Q2 is "off." When the voltage of battery B decreases to the predetermined potential at which power control circuit 20 operates to de-energize lamp L, i.e. transistor Q2 desaturates and its collector voltage increases towards the battery B voltage, thereby to provide sufficient voltage via lamp L to energize light source L2. Thus, transistor Q2 provides a controllable switch function 80 as described above in relation to FIG. 1, for example.

Specifically, because the current needed for lamp L to produce light is substantially greater than that needed for LEDs CR3–CR5 to produce light, the majority of battery B voltage appears across LEDs CR3–CR5 and little voltage appears across lamp L when transistor Q2 is "off" (power control 20 has operated) and switch SW1 is closed. Because the collector of transistor Q2 is coupled to battery B through lamp L, battery voltage will be present at the collector of transistor Q2 via lamp L when switch SW1 is closed and when power control 20 has operated to de-energize lamp L.

As power control 20' begins to operate to de-energize lamp L, transistor Q2 begins to desaturate (i.e. become less conductive than it is in the saturated state) and its collector voltage rises. When the Q2 collector voltage exceeds the turn-on threshold of LEDs CR3–CR5 of light source L2 (e.g., about 2.5 volts), LEDs CR3–CR5 begin to produce light. As the voltage of battery B decreases further, the voltage at the collector of Q2 increases further and lamp L further dims, whereby LEDs CR3–CR5 of light source L2 receive additional power and produce additional light. This regenerative action continues until lamp L is extinguished and LEDs CR3–CR5 are fully energized commensurate with the charge remaining in battery B.

LEDs CR3–CR5 will remain energized until SW1 is opened or battery B discharges to where it no longer has sufficient voltage to energize LEDs CR3–CR5 (e.g., less than the forward voltage of LEDs CR3–CR5 which is typically about 2.5 volts). Should switch SW1 remain closed after the battery is discharged to the point where LEDs CR3–CR5 do not produce substantial light, battery B can become discharged to about the forward voltage of LEDs CR3–CR5, e.g., about 2.5 volts. In this embodiment, LEDs CR3–CR5 do not provide significant light until lamp L is almost extinguished.

Figure 6:
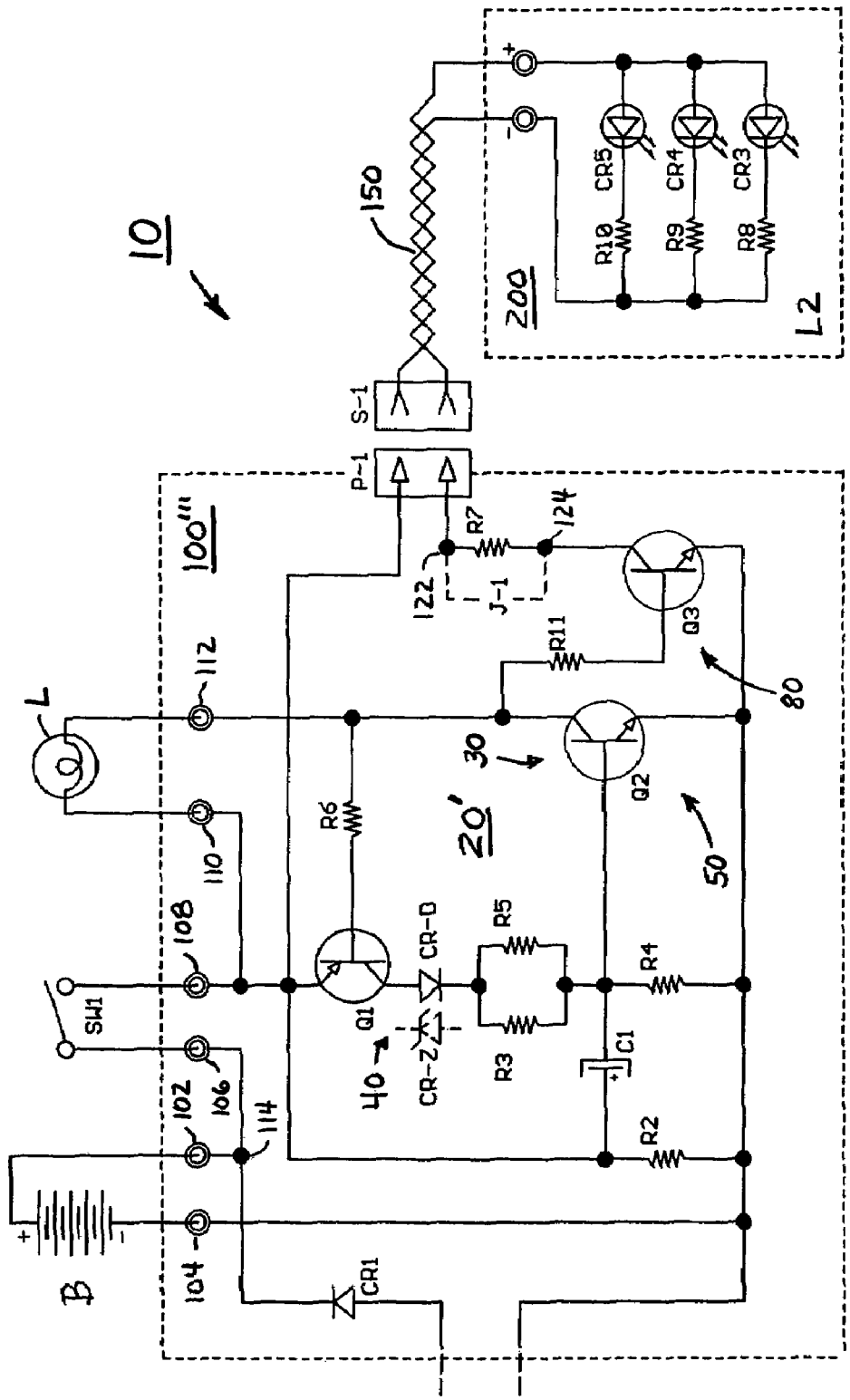
FIG. 6 is a schematic diagram including another example embodiment of a power control circuit, as for a battery-operated light.

FIG. 6 is a schematic diagram including another example embodiment of a power control circuit 20', as for a flashlight 10. Therein, when lamp L is energized to produce light by closing switch SW1, light source L2 is not turned on until the voltage of battery B decreases to the predetermined potential at which power control 20' operates to de-energize lamp L, at which time light source L2 is turned on.

In the drawing of FIG. 6, two reference voltage sources CR-D and CR-Z are shown and both jumper J-1 and resistor R7 are shown, it being understood that only one of each would normally be employed as may be appropriate in view of the battery voltage, lamp type and other design variations, as described above.

Circuit board 100'" of FIG. 6 may be the same circuit board as circuit board 100' of FIG. 4 except that the values of various electronic components may be changed to suit the particular voltages and currents to which it will be subjected, and except that additional and/or different printed conductors are provided for controlling the operation of second light source L2. Specifically, light source L2 is connected to terminal 108 rather than to terminals 102, 106 and 110. Battery B connects to terminals 102 and 104, switch SW1 connects to terminals 106 and 108, and lamp L connects to terminals 110 and 112. One lead of lamp L at terminal 110 is connected to the switched side of switch SW1 at terminal 108 and thence to the positive terminal of battery B via terminals 106 and 102. Power for LED light source L2 is from the switched side of switch SW1.

Power control circuit 20' is the same as power control 20 shown in FIG. 4 and includes resistor R11 and NPN transistor Q3. Thus, power control 20' operates to energize and de-energize lamp L in like manner to power control 20 as described above. LED light source L2 can be energized only if switch SW1 is closed and transistor Q3 is "on" and conducting sufficient current to energize light source L2. Transistor Q3 provides a controllable switch function 80 as described above in relation to FIG. 1, for example.

Specifically, when switch SW1 is closed and transistor Q2 is turned "on" thereby applying battery B voltage to energize lamp L, the base of transistor Q3 is maintained at a low voltage and transistor Q3 is held "off." When power control 20' operates to de-energize lamp L, however, the voltage at the collector of transistor Q2 increases and base current for transistor Q3 flows through resistor R11 to turn Q3 "on" thereby to conduct current from battery B to energize light source L2.

If battery B has sufficient energy (charge) so that its voltage is greater than the predetermined potential at which power control 20' operates to de-energize lamp L, operating switch SW1 will selectively turn lamp L on and off, but operating switch SW1 will not turn LED light source L2 on to produce light unless power control 20' has operated to de-energize lamp L.

For example, as power control 20' begins to operate to de-energize lamp L, transistor Q2 begins to desaturate (i.e. become less conductive than it is in the saturated state) and its collector voltage rises. When the Q2 collector voltage exceeds the turn-on threshold of transistor Q3 (e.g., about 0.65 volt), Q3 begins to conduct and LEDs CR3–CR5 begin to produce light (e.g., when the voltage applied thereto exceeds a threshold of about 2.5 volts) before lamp L extinguishes. As the voltage of battery B decreases further, the voltage at the collector of Q2 increases further and lamp L further dims and Q3 turns further on, whereby LEDs CR3–CR5 of light source L2 receive additional power and produce additional light. This regenerative action continues until lamp L is extinguished, transistors Q1 and Q2 are "off" and LEDs CR3–CR5 are fully energized commensurate with the charge remaining in battery B. LEDs CR3–CR5 will remain energized until SW1 is opened or battery B discharges to where it no longer has sufficient voltage to energize LEDs CR3–CR5 (e.g., less than the forward voltage of LEDs CR3–CR5 which is typically about 2.5 volts).

However, when lamp L is energized to produce light, light source L2 cannot be turned on until the voltage of battery B decreases to the predetermined potential at which power control 20' operates to de-energize lamp L, at which time light source L2 provides light. Should switch SW1 remain closed after the battery is discharged to the point where LEDs CR3–CR5 do not produce substantial light, battery B can become discharged to about 0.65 volt.

The arrangements of FIGS. 4–6 may be viewed as a light that provides an unexpectedly long operating time, e.g., the operating time is greatly extended because the LEDs continue to provide light long after the lamp has substantially discharged the battery. Therein, NPN transistor Q3 may be a type ZTX-849 power transistor as is transistor Q2, and other electronic components may be as described above.

Figure 7:
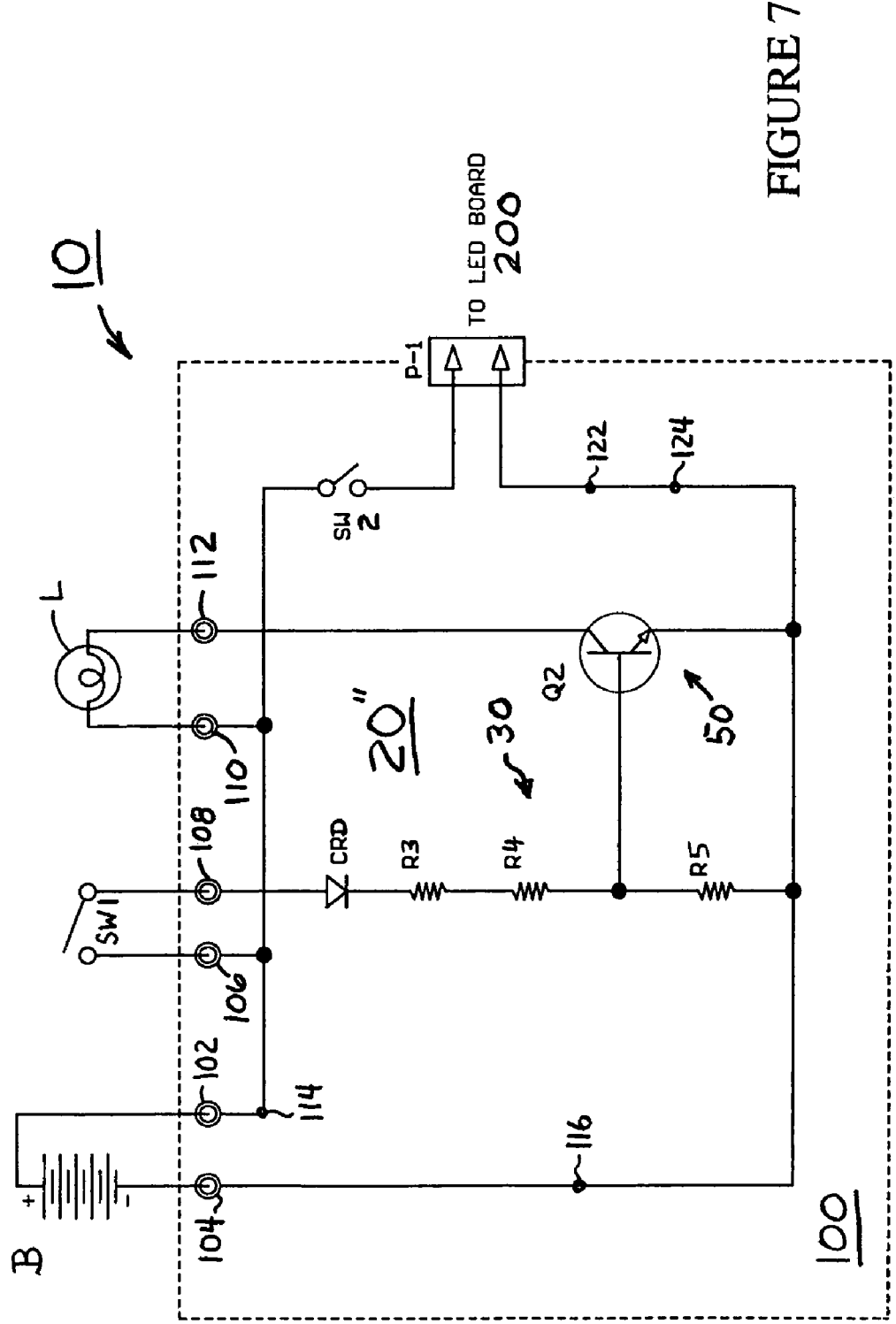
FIG. 7 is a schematic diagram including another example embodiment of a power control circuit, as for a battery-operated light.

FIG. 7 is a schematic diagram including another example embodiment of a power control circuit 20", as for a battery-operated light 10. Control circuit 20" on circuit board 100 is similar to the embodiment shown in FIG. 2 except that transistor Q1, resistors R2 and R6, and capacitor C1 are absent, and resistors R3, R4 are in series rather than in parallel. As above, switches SW1 and SW2 are operable independently for respectively controlling energization of lamp L and light source L2 of LED board 200.

When switch SW1 is closed, reference voltage diode CR-D in cooperation with the voltage divider provided by resistors R3, R4, R5 provides voltage at the base of comparator 30 transistor Q2 for operating transistor Q2 as a controllable switch 50. When the battery B voltage exceeds a given voltage, transistor Q2 turns "on" to apply voltage from battery B to lamp L, and when battery B voltage either decreases below or is below a given voltage, transistor Q2 turns "off" to remove battery B voltage from lamp L. Thus, as described above, relatively high-current lamp L is de-energized when battery B becomes discharged, but before battery B is fully discharged.

Without the feedback provided via transistor Q1 as described above, however, control circuit 20" tends to extinguish lamp L in a "softer" action as the voltage of battery B decreases over a relatively greater range of voltage, rather than quickly as the battery B voltage decreases over a relatively smaller voltage change, as in the embodiments described above. While the "quicker" action may in some instances de-energize lamp L with a greater residual charge remaining in battery B, the "softer" action can be desirable in that the lamp dims similarly to the way it would dim if battery B actually was approaching full discharge (i.e. without circuit 20").

R3 and R4 in series may be a convenient way for providing a greater power dissipation therein with lower wattage-rated resistors than if a single resistor were utilized, as is also the case where R3 and R4 are in parallel. While one diode CR-D is illustrated, one or more diodes may be employed to obtain a desired value of reference voltage. The connection between terminals 122, 124 may be a jumper wire, a conductor on circuit board 100, or a resistor of suitable value for providing the desired current flow to LED board 200 for a given battery B, e.g., a three-cell or five-cell or other battery. The circuit illustrated is typically utilized with a three-cell battery B, one diode CR-D, and a jumper between terminals 122, 124.

Figure 8:
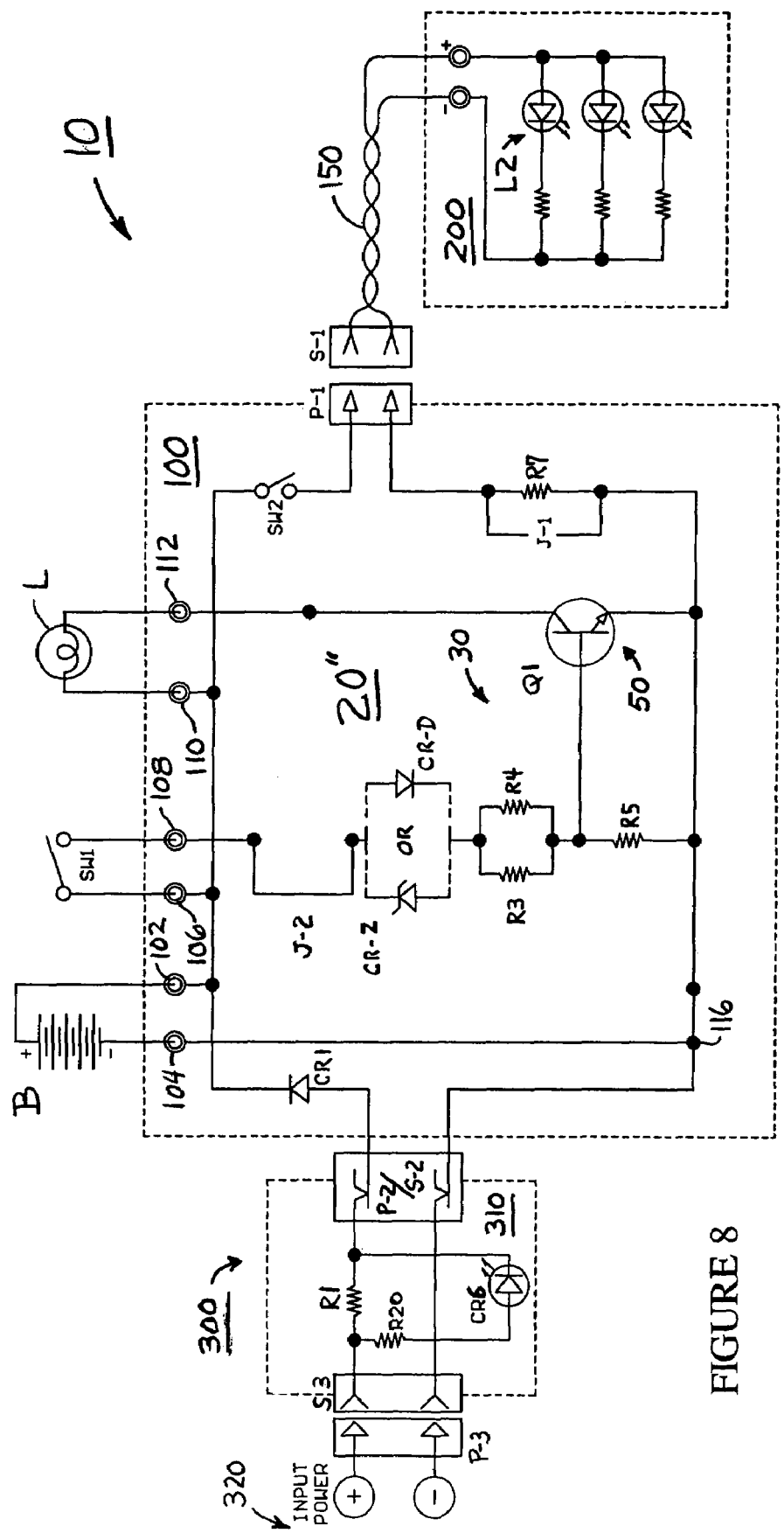
FIG. 8 is a schematic diagram including another example embodiment of a power control circuit, as for a battery-operated light.

FIG. 8 is a schematic diagram including another example embodiment of a power control circuit 20"', as for a battery-operated light 10. Control circuit 20"' on circuit board 100 is similar to the embodiment shown in FIG. 3 except that transistor Q1, resistors R2 and R6, and capacitor C1 are absent. As above, switches SW1 and SW2 are operable independently for respectively controlling energization of lamp L and light source L2 of LED board 200.

When switch SW1 is closed, reference voltage diode CR-Z (or alternatively, one or more diodes CR-D) in cooperation with the voltage divider provided by resistors R3, R4, R5 provides voltage at the base of comparator 30 transistor Q2 for operating transistor Q2 as a controllable switch 50. When the battery B voltage exceeds a given voltage, transistor Q2 turns "on" to apply voltage from battery B to lamp L, and when battery B voltage either decreases below or is below a given voltage, transistor Q2 turns "off" to remove battery B voltage from lamp L.

Thus, as described above, relatively high-current lamp L is de-energized when battery B becomes discharged, but before battery B is fully discharged. Also as described above, without transistor Q1, control circuit 20"' tends to extinguish lamp L in a "softer" action in extinguishing lamp L. Where Q1 is absent, e.g., simply by not providing a transistor device, jumper J-2 may be employed to provide connection in place of the collector-emitter path of transistor Q1.

R3 and R4 in parallel may be a convenient way for providing a greater power dissipation therein with lower wattage-rated resistors than if a single resistor were utilized, as is the case where R3 and R4 are in series as described above. While one diode CR-Z is illustrated, one or more Zener diodes CR-Z or diodes CR-D may be employed to obtain a desired value of reference voltage. The connection between terminals 122, 124 may be a jumper wire J-1, a conductor on circuit board 100, or a resistor R7 of suitable value for providing the desired current flow to LED board 200 for a given battery B, e.g., a three-cell or five-cell or other battery. The circuit illustrated is typically utilized with a five-cell battery B, one Zener diode CR-Z, and a resistor R7 between terminals 122, 124.

Charger 300 and charging sleeve 310 are as described above, e.g., in relation to FIG. 3, except that LED CR6 and resistor R20 are connected across current limiting resistor R1 for providing an indication that charging current is flowing, i.e. when the voltage drop across resistor R1 is sufficient to activate LED CR6.

A battery-operated light 10 comprises a first light source L, a battery B and a first switch SW, SW1 in circuit for selectively energizing the first light source L to produce light, a source 40, CR-D, CR-Z of a reference potential, and a comparator or comparing circuit 30, 50, Q2 responsive to a potential produced by the battery B and to the reference potential 40, CR-D, CR-Z for de-energizing the first light source L when the battery B potential is below a predetermined potential. A second light source L2, 200, CR3, CR4, CR5 operates at a lower current than does the first light source L to produce light and a second switch 80, SW2 is in circuit with the battery B for selectively energizing the second light source L2, 200, CR3, CR4, CR5 to produce light.

Second switch 80, SW2 may be operable independently of first switch SW, SW1 and/or may be operable responsive to comparator 30, 50, Q2 de-energizing first light source L when battery B potential is below the predetermined potential. Second switch 80, SW2, may comprise a transistor Q3 having a controllable conduction path in circuit with battery B and second light source L2, 200, CR3, CR4, CR5, and having a control terminal coupled to comparator 30, 50, Q2 for controlling second light source L2, 200, CR3, CR4, CR5 responsive to comparator 30, 50, Q2 de-energizing first light source L when the battery B potential is below the predetermined potential.

The source 40, CR-D, CR-Z of reference potential may comprise a diode CR-D and/or a Zener diode CR-Z and/or a resistive voltage divider R3, R4, R5, and/or the resistive voltage divider R3, R4, R5 may couple the source 40, CR-D, CR-Z of reference potential to the control terminal of the first transistor Q2.

The comparator or comparing circuit 30, 50, Q2 may comprise a first transistor Q2 having a controllable conduction path in circuit with the battery B and the light source L for energizing and de-energizing the light source L and having a control electrode to which the source 40, CR-D, CR-Z of reference potential is coupled. A second transistor Q1 may have a controllable conduction path in circuit with the battery B and the source 40, CR-D, CR-Z of reference potential and a control terminal coupled to the controllable conduction path of the first transistor Q2.

Second switch 80, SW2 may comprise a transistor Q3 having a controllable conduction path in circuit with battery B and second light source L2, 200, CR3, CR4, CR5 and having a control terminal coupled to the controllable conduction path of transistor Q2.

In battery-operated light 10, the first light source L may include an incandescent lamp L and the second light source L2, 200, CR3, CR4, CR5 may include a solid state light source 200, CR3, CR4, CR5 and/or a light emitting diode CR3, CR4, CR5.

Battery-operated light 10 may further comprise means 80, Q3 for energizing the second light source L2, 200, CR3, CR4, CR5 responsive to the comparator 30, 50, Q2 de-energizing the first light source L when the battery B potential is below the predetermined potential. The means 80, Q3 for energizing may comprise a transistor Q3 having a controllable conduction path in circuit with the battery B and the second light source L2, 200, CR3, CR4, CR5 and having a control terminal coupled to a controllable conduction path of transistor Q2 of the comparator 30, 50.

Example battery operated lights suitable for including a power control as described herein include the SL-Series lights (e.g., types SL-20X™, SL-20XP™ and SL-35X™ flashlights) and/or the STINGER®, STINGER XT™, POLYSTINGER™, ULTRASTINGER™ lights, all available from Streamlight, Inc., located in Eagleville, Pa. The foregoing lights may be modified to include one or more LED solid state light sources in addition to a halogen or xenon incandescent lamp. One preferred arrangement includes three "white" light-emitting diodes (LEDs) as the solid state light source. These LEDs produce light at voltages greater than about 2.5 volts and typically draw about 10–100 milliamperes of current when producing light.

Another example battery operated light that is suitable for including a power control as described herein is the SYCLONE® light, also available from Streamlight, Inc., which includes an LED in addition to a krypton gas-filled incandescent lamp.

As used herein, the term "about" means that dimensions, sizes, parameters, voltages, currents, and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, parameter, voltage, current, or other quantity or characteristic is "about" or "approximate" whether or not expressly stated to be such.

While the present invention has been described in terms of the foregoing exemplary embodiments, variations within the scope and spirit of the present invention as defined by the claims following will be apparent to those skilled in the art.

For example, while the second light source is illustrated as three LEDs in parallel, however, any suitable number of LEDs or other relatively lower current light sources may be employed in any suitable series and/or parallel connection. Alternative second light sources might include, e.g., electro-luminescent materials and the like, compatible with the voltage and current capacity of the battery B utilized.

Further, the bipolar transistors described are examples of controllable devices, and other controllable devices such as field effect transistors and/or integrated circuits may be employed. The circuit of power control circuit 20 may be embodied in discrete electronic components mounted on a printed circuit board or may be embodied wholly or in part in an integrated circuit. In addition, other circuit arrangements may be employed to provide the function of power control 20.

While connectors P-1, P-2, P-3 are illustrated as "plugs" (i.e. male connectors) and connectors S-1, S-2, S-3 are illustrated as "sockets" (i.e. female connectors), plugs and sockets may be interchanged as desired and/or any connector may have any desired combination of male and/or female connector contacts complementary to its mate for proper mating. Further, the use of connectors and/or of terminals, as shown or otherwise, is optional.

What is claimed is:

1. In a battery-operated light comprising a first light source, a battery and a first switch connected for selectively energizing the first light source to produce light:
   a source of a reference potential;
   a comparator responsive to a potential produced by the battery and to the reference potential for de-energizing only said first light source when the battery is discharged to a predetermined potential, but is not fully discharged;
   a second light source that operates at a lower current than does said first light source to produce light; and
   a second switch connected with the battery for selectively energizing said second light source to produce light, whereby the second light source is energizable by the battery after the comparator has de-energized the first light source.

2. The battery-operated light of claim 1 wherein said second switch is operable independently of said first switch and/or is operable responsive to said comparator de-energizing said first light source when the battery potential is below the predetermined potential.

3. The battery-operated light of claim 1 wherein said second switch comprises a transistor having a controllable conduction path connected with the battery and said second light source and having a control electrode coupled to said comparator for controlling said second light source responsive to said comparator de-energizing said first light source when the battery potential is below the predetermined potential.

4. The battery-operated light of claim 1 wherein said source of reference potential comprises a diode and/or a Zener diode and/or a resistive voltage divider.

5. The battery-operated light of claim 1 wherein said comparator comprises a first transistor having a controllable conduction path connected with the battery and said first light source for energizing and de-energizing said first light source and having a control electrode to which said source of reference potential is coupled.

6. The battery-operated light of claim 5 further comprising a resistive voltage divider coupling said source of reference potential to the control electrode of said first transistor.

7. In a battery-operated light comprising a first light source, a battery and a first switch connected for selectively energizing the first light source to produce light:
- a source of a reference potential;
- a comparator responsive to a potential produced by the battery and to the reference potential for de-energizing only said first light source when the battery is discharged to a predetermined potential, but is not fully discharged,
- wherein said comparator comprises a first transistor having a controllable conduction path connected with the battery and said first light source for energizing and de-energizing said first light source and having a control electrode to which said source of reference potential is coupled;
- a second light source that operates at a lower current than does said first light source to produce light;
- a second switch connected with the battery for selectively energizing said second light source to produce light; and
- a second transistor having a controllable conduction path connected with the battery and said source of reference potential and having a control electrode coupled to the controllable conduction path of said first transistor for being controlled by said first transistor,
- whereby the second light source is energizable by the battery after the comparator has de-energized the first light source.

8. In a battery-operated light comprising a first light source, a battery and a first switch connected for selectively energizing the first light source to produce light:
- a source of a reference potential;
- a comparator responsive to a potential produced by the battery and to the reference potential for de-energizing only said first light source when the battery is discharged to a predetermined potential, but is not fully discharged,
- wherein said comparator comprises a first transistor having a controllable conduction path connected with the battery and said first light source for energizing and de-energizing said first light source and having a control electrode to which said source of reference potential is coupled;
- a second light source that operates at a lower current than does said first light source to produce light; and
- a second switch connected with the battery for selectively energizing said second light source to produce light,
- wherein said second switch comprises a second transistor having a controllable conduction path connected with the battery and said second light source and having a control electrode coupled to the controllable conduction path of said first transistor for being controlled by said first transistor,
- whereby the second light source is energizable by the battery after the comparator has de-energized the first light source.

9. The battery-operated light of claim 1 wherein said first light source includes an incandescent lamp and said second light source includes a solid state light source and/or a light emitting diode.

10. The battery-operated light of claim 1 further comprising means for energizing said second light source responsive to said comparator de-energizing said first light source when the battery potential is below the predetermined potential.

11. In a battery-operated light comprising a first light source, a battery and a first switch connected for selectively energizing the first light source to produce light:
- a source of a reference potential;
- a comparator responsive to a potential produced by the battery and to the reference potential for de-energizing only said first light source when the battery is discharged to a predetermined potential, but is not fully discharged;
- a second light source that operates at a lower current than does said first light source to produce light;
- a second switch connected with the battery for selectively energizing said second light source to produce light; and
- a transistor having a controllable conduction path connected with the battery and said second light source and having a control electrode coupled to said comparator, wherein said transistor energizes said second light source responsive to said comparator de-energizing said first light source when the battery potential is below the predetermined potential.

12. In a battery-operated light comprising an incandescent light source, a battery and a first switch connected for selectively energizing the incandescent light source to produce light:
- a source of a reference potential;
- a comparing circuit responsive to a potential produced by the battery and to the reference potential for de-energizing only said incandescent light source when the battery is discharged to a predetermined potential, but is not fully discharged;
- a solid state light source; and
- a second switch connected with the battery for selectively energizing said solid state light source to produce light independently of said first switch and/or when the battery potential is below the predetermined potential,
- whereby the solid state light source is energizable by the battery after the comparing circuit has de-energized the incandescent light source.

13. The battery-operated light of claim 12 wherein said source of reference potential comprises a diode and/or a Zener diode and/or a resistive voltage divider.

14. The battery-operated light of claim 12 wherein said second switch is operable responsive to said comparing circuit de-energizing said incandescent light source when the battery potential is below the predetermined potential.

15. The battery-operated light of claim 12 wherein said second switch comprises a transistor having a controllable conduction path connected with the battery and said solid state light source and having a control electrode coupled to said comparing circuit for controlling said solid state light source responsive to said comparing circuit de-energizing said incandescent light source when the battery potential is below the predetermined potential.

16. The battery-operated light of claim 12 wherein said comparing circuit comprises a first transistor having a controllable conduction path connected with the battery and said incandescent light source for energizing and de-energizing said incandescent light source and having a control electrode to which said source of reference potential is coupled.

17. The battery-operated light of claim 16 further comprising a resistive voltage divider coupling said source of reference potential to the control electrode of said first transistor.

18. In a battery-operated light comprising an incandescent light source, a battery and a first switch connected for selectively energizing the incandescent light source to produce light:
- a source of a reference potential;

a comparing circuit responsive to a potential produced by the battery and to the reference potential for de-energizing only said incandescent light source when the battery is discharged to a predetermined potential, but is not fully discharged;

said comparing circuit comprising a first transistor having a controllable conduction path connected with the battery and said incandescent light source for energizing and de-energizing said incandescent light source and having a control electrode to which said source of reference potential is coupled;

a solid state light source;

a second switch connected with the battery for selectively energizing said solid state light source to produce light independently of said first switch, or to produce light when the battery potential is below the predetermined potential, or to produce light independently of said first switch when the battery potential is below the predetermined potential; and a second transistor having a controllable conduction path connected with the battery and said source of reference potential and having a control electrode coupled to the controllable conduction path of said first transistor for being controlled by said first transistor, whereby the solid state light source is energizable by the battery after the comparing circuit has de-energized the incandescent light source.

19. The battery-operated light of claim 16 wherein said second switch comprises a second transistor having a controllable conduction path connected with the battery and said solid state light source and having a control electrode coupled to the controllable conduction path of said first transistor.

20. The battery-operated light of claim 12 further comprising means for energizing said solid state light source responsive to said comparing circuit de-energizing said incandescent light source when the battery potential is below the predetermined potential.

21. In a battery-operated light comprising an incandescent light source, a battery and a first switch connected for selectively energizing the incandescent light source to produce light:

a source of a reference potential;

a comparing circuit responsive to a potential produced by the battery and to the reference potential for de-energizing only said incandescent light source when the battery is discharged to a predetermined potential, but is not fully discharged;

a solid state light source;

a second switch connected with the battery for selectively energizing said solid state light source to produce light independently of said first switch, or to produce light when the battery potential is below the predetermined potential, or to produce light independently of said first switch when the battery potential is below the predetermined potential; and means for energizing said solid state light source responsive to said comparing circuit de-energizing said incandescent light source when the battery potential is below the predetermined potential, wherein said means for energizing comprises a second transistor having a controllable conduction path connected with the battery and said second light source and having a control electrode coupled to said comparing circuit for being controlled by said comparing circuit.

22. A power control for battery-operated apparatus comprising:

first and second terminals for receiving a battery potential;

a first transistor having a controllable conduction path between first and second electrodes and having a control electrode for controlling the conduction of the controllable conduction path thereof, the first electrode thereof being coupled to said first terminal;

a second transistor having a controllable conduction path between first and second electrodes and having a control electrode for controlling the conduction of the controllable conduction path thereof, the first electrode thereof being coupled to said second terminal; and a source of reference potential coupled between the second electrode of said first transistor and the control electrode of said second transistor;

wherein the second electrode of said second transistor is coupled to the control electrode of said first transistor and to said first terminal via a first load; and wherein the controllable conduction path of said second transistor becomes non-conductive for de-energizing only the first load as a received battery potential decreases to a predetermined potential at which a battery providing the predetermined potential is not fully discharged; and means for energizing a second load at least when the first load is de-energized by said second transistor becoming non-conductive, whereby the second load is energizable by the received battery potential after the second transistor has de-energized the first load.

23. The power control of claim 22 wherein said means for energizing comprises a third transistor having a controllable conduction path between first and second electrodes and having a control electrode for controlling the conduction of the controllable conduction path thereof, the first electrode thereof being coupled to the second load and the control electrode thereof being coupled to the second electrode of said second transistor.

24. The power control of claim 23 further comprising a switch connected with the second load and said third transistor for making and breaking connection with said first terminal.

25. The power control of claim 23 wherein said first load includes an incandescent lamp and said second load includes a solid state light source and/or a light emitting diode.

26. The power control of claim 22 further comprising a switch connected with said first load and with said first transistor or said second transistor or both said first transistor and said second transistor for making and breaking connection with said first terminal.

27. The power control of claim 22 wherein said source of reference potential comprises a diode and/or a Zener diode and/or a resistive voltage divider.

28. A power control for battery-operated apparatus comprising:

first and second terminals for receiving a battery potential;

a first switch having first and second ends, the first end thereof being coupled to said first terminal;

a first transistor having a controllable conduction path between first and second electrodes and having a control electrode for controlling the conduction of the controllable conduction path thereof, the first electrode thereof being coupled to said second terminal; and a source of reference potential coupled between the second end of said first switch and the control electrode of said first transistor;

wherein the second electrode of said first transistor is coupled to said first terminal via a first load, and wherein the controllable conduction path of said first transistor becomes non-conductive for de-energizing only the first load as a received battery potential decreases to a predetermined potential at which a battery providing the predetermined potential is not fully discharged; and means for energizing a second load at least when the first load is de-energized by said first transistor becoming non-conductive, whereby the second load is energizable by the battery after the first transistor has de-energized the first load.

29. A power control for battery-operated apparatus comprising:

first and second terminals for receiving a battery potential;

a first switch having first and second ends, the first end thereof being coupled to said first terminal;

a first transistor having a controllable conduction path between first and second electrodes and having a control electrode for controlling the conduction of the controllable conduction path thereof, the first electrode thereof being coupled to said second terminal;

a source of reference potential coupled between the second end of said first switch and the control electrode of said first transistor;

wherein the second electrode of said first transistor is coupled to said first terminal via a first load; and a second transistor having a controllable conduction path between first and second electrodes and having a control electrode for controlling the conduction of the controllable conduction path thereof, the first electrode thereof being coupled to a second load and the control electrode thereof being coupled to the second electrode of said first transistor, wherein the controllable conduction path of said first transistor becomes non-conductive for de-energizing only the first load as a received battery potential decreases to a predetermined potential at which a battery providing the predetermined potential is not fully discharged, and whereby the second load is energized by the received battery potential via the second transistor when the first transistor has de-energized the first load.

30. The power control of claim 29 further comprising a second switch connected with the second load and said second transistor for making and breaking connection with said first terminal, wherein said second switch is operable independently of said first switch.

31. The power control of claim 29 wherein said first load includes an incandescent lamp and said second load includes a solid state light source and/or a light emitting diode.

32. The power control of claim 28 wherein said source of reference potential comprises a diode and/or a Zener diode and/or a resistive voltage divider.

33. A power control for battery-operated apparatus comprising:

first and second terminals for receiving a battery potential;

a first switch having first and second ends, the first end thereof being coupled to said first terminal;

a first transistor having a controllable conduction path between first and second electrodes and having a control electrode for controlling the conduction of the controllable conduction path thereof, the first electrode thereof being coupled to said second terminal;

a source of reference potential coupled between the second end of said first switch and the control electrode of said first transistor;

wherein the second electrode of said first transistor is coupled to said first terminal via a load; and a second transistor having a controllable conduction path coupled between the battery and said source of reference potential and having a control electrode for controlling the conduction of the controllable conduction path thereof, the control electrode thereof being coupled to the controllable conduction path of said first transistor for being controlled by said first transistor, wherein the controllable conduction path of said first transistor becomes non-conductive responsive to the reference potential and a received battery potential for de-energizing only the load as a received battery potential decreases to a predetermined potential at which a battery providing the predetermined potential is not fully discharged.

34. In a battery-operated flashlight comprising a first light source, a battery and a first switch connected for selectively energizing the first light source to produce light:

a source of a reference potential;

a comparator responsive to a potential produced by the battery and to the reference potential for de-energizing only said first light source when the battery is discharged to a predetermined potential, but is not fully discharged; and a second light source that operates to produce light at a lower current than does said first light source, wherein said second light source is selectively operable from the battery to produce light at least after said comparator de-energizes said first light source, whereby the second light source is energizable by the battery after the comparator has de-energized the first light source.

35. A power control for a battery-operated light comprising:

first and second terminals for receiving a battery potential;

a first switch having first and second ends, the first end thereof being coupled to said first terminal;

a transistor having a controllable conduction path between first and second electrodes and having a control electrode for controlling the conduction of the controllable conduction path thereof, the first electrode thereof being coupled to said second terminal;

a source of reference potential coupled between the second end of said first switch and the control electrode of said transistor;

a first light source for producing light when electrically energized;

wherein the second electrode of said transistor is coupled to said first terminal via said first light source, wherein the controllable conduction path of said transistor becomes non-conductive responsive to the reference potential for de-energizing only said first light source as a received battery potential decreases to a predetermined potential at which a battery providing the predetermined potential is not fully discharged;

a second light source for producing light when energized at a lower current than that required by said first light source to produce light; and a second switch operable independently of said first switch, wherein said second switch and said second light source are coupled between said first and second terminals for selectively energizing said second light source, whereby the second light source is energizable by a received battery potential after the transistor has de-energized the first light source.

36. The battery-operated light of claim 1 wherein said comparator de-energizes said first light source by dimming said first light source over a time, thereby to mimic the battery approaching full discharge.

37. The battery-operated light of claim 7 wherein said comparator de-energizes said first light source by dimming said first light source over a time, thereby to mimic the battery approaching full discharge.

38. The battery-operated light of claim 8 wherein said comparator de-energizes said first light source by dimming said first light source over a time, thereby to mimic the battery approaching full discharge.

39. The battery-operated light of claim 11 wherein said comparator de-energizes said first light source by dimming said first light source over a time, thereby to mimic the battery approaching full discharge.

40. The battery-operated light of claim 12 wherein said comparing circuit de-energizes said incandescent light source by dimming said incandescent light source over a time, thereby to mimic the battery approaching full discharge.

41. The battery-operated light of claim 18 wherein said comparing circuit de-energizes said incandescent light source by dimming said incandescent light source over a time, thereby to mimic the battery approaching full discharge.

42. The battery-operated light of claim 21 wherein said comparing circuit de-energizes said incandescent light source by dimming said incandescent light source over a time, thereby to mimic the battery approaching full discharge.

43. The power control claim 22 wherein said second transistor de-energizes said first load over a time, thereby to mimic a battery approaching full discharge.

44. The power control of claim 28 wherein said first transistor de-energizes said first load over a time, thereby to mimic a battery approaching full discharge.

45. The power control of claim 29 wherein said first transistor de-energizes said first load over a time, thereby to mimic a battery approaching full discharge.

46. The power control of claim 33 wherein said first transistor de-energizes said load over a time, thereby to mimic a battery approaching full discharge.

47. The battery-operated flashlight of claim 34 wherein said comparator de-energizes said first light source over a time, thereby to mimic the battery approaching full discharge.

48. The power control of claim 35 wherein said transistor de-energizes said first light source over a time, thereby to mimic a battery approaching full discharge.

* * * * *